May 3, 1932.  G. W. HOPKINS  1,856,638
AUTOMATIC CONTROL APPARATUS
Filed Dec. 5, 1928  4 Sheets-Sheet 1
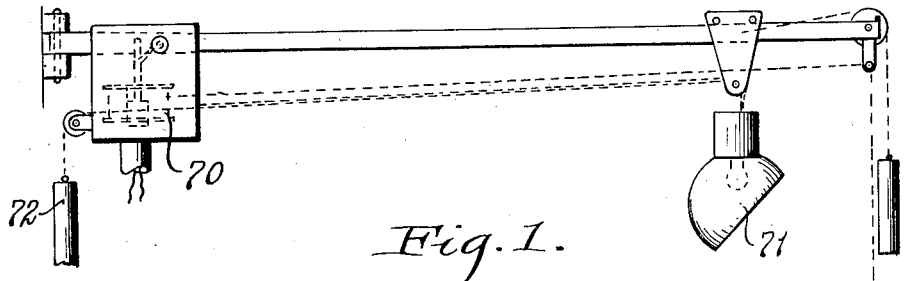
Fig. 1.
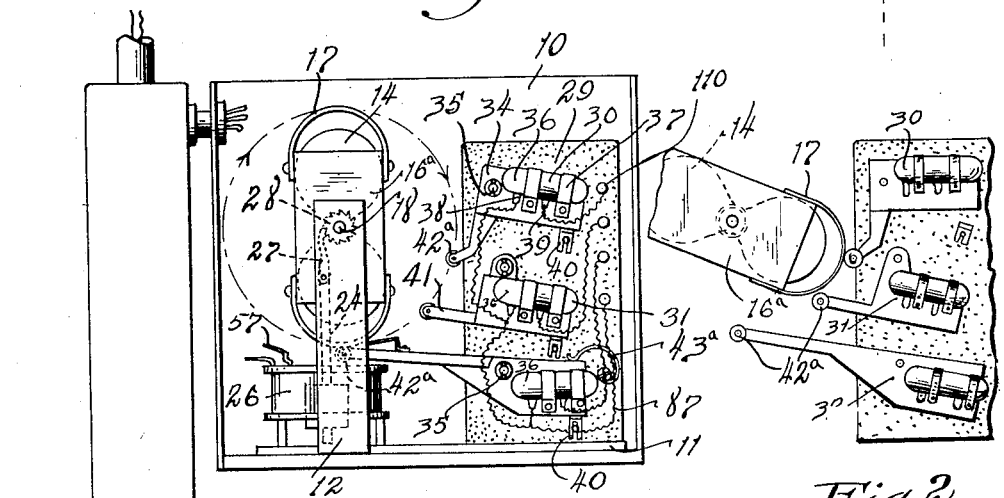
Fig. 2.
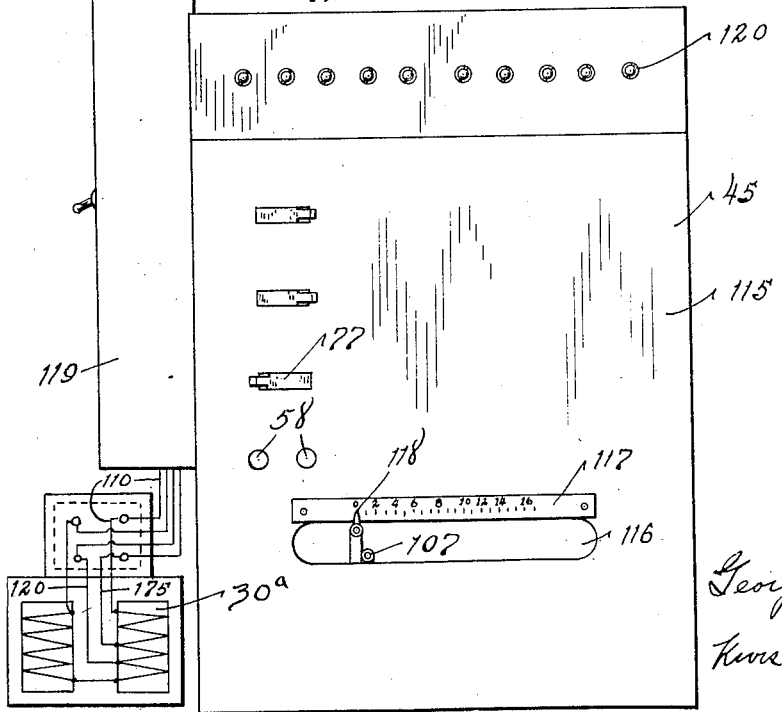
INVENTOR
George W. Hopkins
Kerr Hudson & Kent
ATTORNEYS

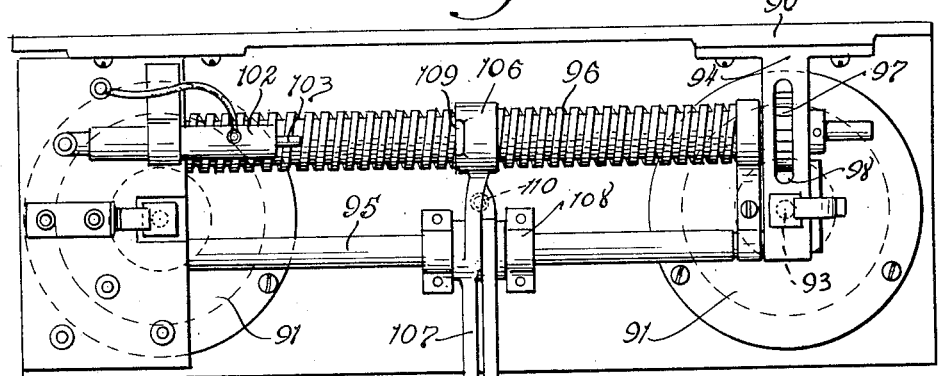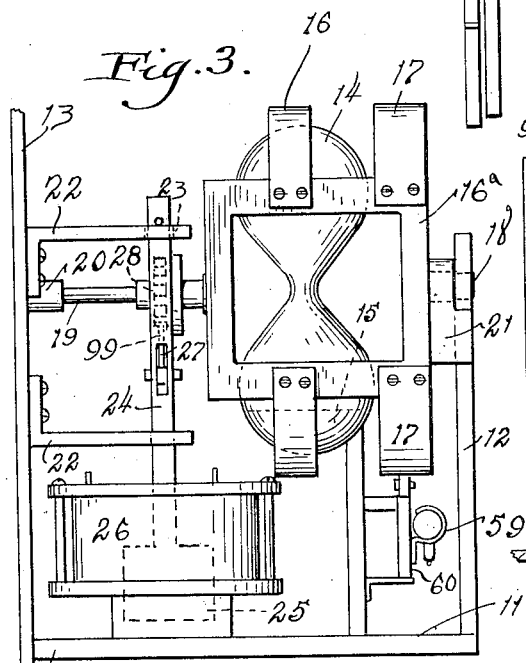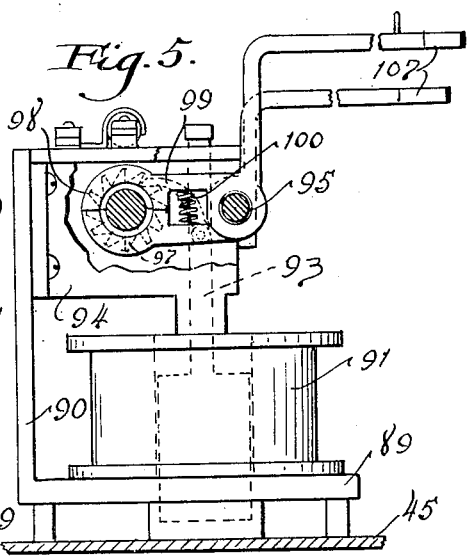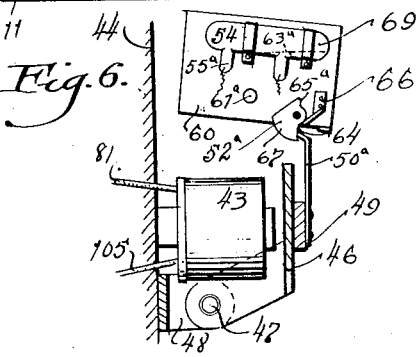

May 3, 1932. G. W. HOPKINS 1,856,638
AUTOMATIC CONTROL APPARATUS
Filed Dec. 5, 1928 4 Sheets-Sheet 3

Inventor:
George W. Hopkins
Kwu Hudson & Kent
ATTORNEYS

Patented May 3, 1932

1,856,638

UNITED STATES PATENT OFFICE

GEORGE W. HOPKINS, OF CLEVELAND, OHIO

AUTOMATIC CONTROL APPARATUS

Application filed December 5, 1928. Serial No. 323,884.

This invention relates to an automatic control apparatus principally employed for therapeutic purposes whereby it is desired to automatically control the operation of the elements used in connection with the treatments, such as the carbon arc lamp used in administering the ultra violet rays treatment, although its use is not to be limited thereto as it will be seen from the description therof that it has many additional applications.

One of the principal objects of the invention is to provide an automatically controlled switch whereby the voltage is successively supplied to the carbon arc lamp or other devices, thereby preventing injury to the arc lamp.

Another object of the present invention is to provide an automatically operated apparatus of the character referred to whereby the only requirement of the operator or attendant is to press the starter button thereby eliminating the necessity of the practically continuous presence of the operator or attendant and at the same time to provide a fool-proof apparatus.

A still further object of the present invention is to provide a new and novel timing mechanism which may be properly set, depending upon the time required for administering the desired treatment and which will at the end of the treatment, automatically shut off the apparatus and cause the arc lamp, or other device being used to administer the treatment, to be shut off and moved away from the patient thereby avoiding possible injury by burning or otherwise.

With the objects above indicated and other objects hereinafter explained in view, the invention consists in the construction and combination of elements hereinafter described and claimed.

Referring to the drawings,

Figure 1 is a front elevational view of the apparatus, a portion of the housing being removed to more clearly illustrate the automatic switch embodying the invention.

Fig. 2 is a fragmentary front elevational view showing the manner in which the automatic switch is operated.

Fig. 3 is an end elevational view of the switch mechanism shown in Fig. 1.

Fig. 4 is a top plan view of the timing mechanism.

Fig. 5 is an end elevational view of the timing mechanism shown in Fig. 4.

Fig. 6 is a fragmentary cross sectional view taken on line 6—6 of Fig. 8 and showing the circuit breaker.

Fig. 7 is a fragmentary cross sectional view taken on line 7—7 of Fig. 8 looking the other way from Fig. 6.

Figures 8, 9:
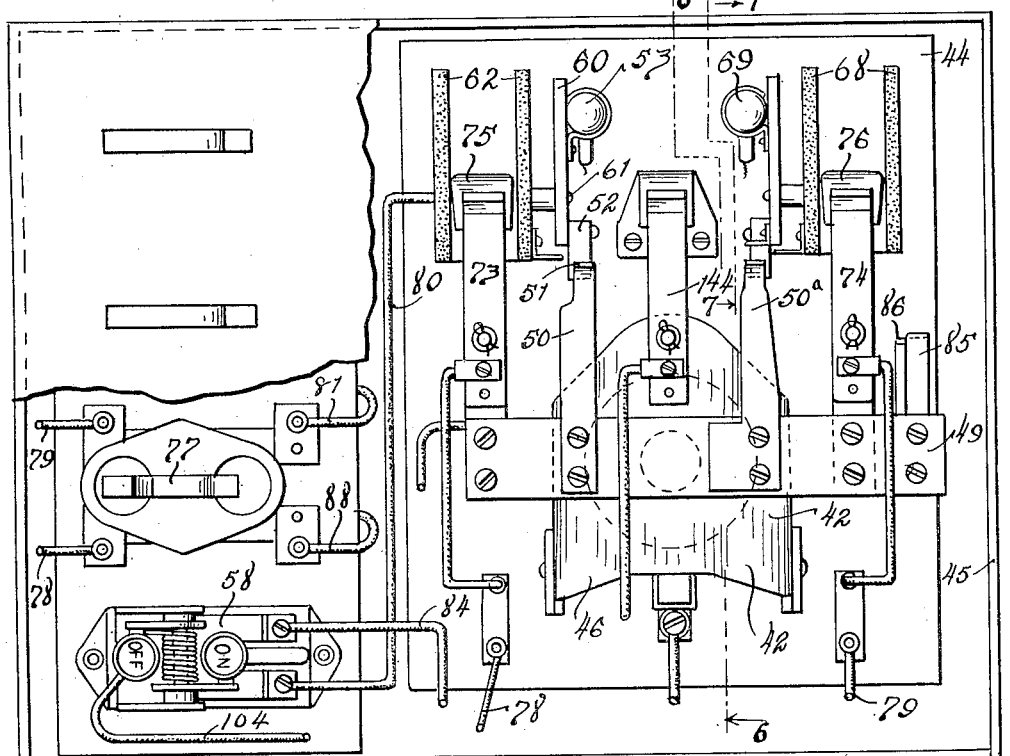
Fig. 8 is a front elevational view of the circuit breaker.
Fig. 9 is a front elevational view of the timing mechanism shown in Fig. 4.

One application of the present invention is in connection with the administration of the ultra violet rays by the use of a carbon arc lamp. It is well known that the entire voltage required by the arc lamp cannot be supplied thereto at one time in view of the fact that the glass bulb would be very likely to become cracked or broken due to the application of the heat created and transmitted thereto. It is the usual practice therefore to have resistance connected in the circuit leading to the arc lamp and to cut in the resistance at the proper time so that low voltage is first applied to the arc lamp and then a higher voltage and then the full voltage, this being accomplished by individual manually operated snap switches and the like.

This condition has proven very unsatisfactory in that it requires the constant attention of an operator or attendant and further, because considerable time is lost between each increase in voltage supplied to the arc lamp.

Another disadvantage of the present systems with which I am familiar is that it requires an attendant or operator to be constantly present during the administering of the ultra violet rays treatment. It is necessary for the operator or the attendant to lower the arc lamp into proper position above the patient being treated and also requires the presence of the attendant when the treatment is completed inasmuch as the arc lamp must be raised away from the patient in order to avoid burning or other injury. At about the time the arc lamp has been raised at the end of the treatment, it is necessary for the operator to cut off the current to the arc lamp.

Another disadvantage in the administration of the treatments is the manner in which the time of the treatment is determined. This is done in numerous ways but very often by some sort of an alarm to attract the attention of the attendant at the end of a predetermined period of time. The attendant then is required to very promptly go to the operating room in which the treatment is being given in order to shut off the current to the arc lamp.

Where only a few of these treatments are administered during the day such a system is not altogether inefficient as the attendant's presence is probably only required in connection with the operation of one machine or apparatus for administering these treatments. But where several hundred of these treatments are administered during a day's time it will readily be understood that efficiency in operation and savings of time is of primary importance and in view of the fact that the present apparatus is designed to be wholly automatic the disadvantages previously referred to are entirely eliminated.

Furthermore, with the present system a single attendant is enabled at a glance at a signal board in the attendant's room to determine immediately which of the rooms in which the treatments are administered are occupied as well as which of the apparatus in those respective rooms are in operation. Furthermore, the only requirement of the attendant is to lower the arc lamp into proper position above the patient, set the timing mechanism and press the starter button. From then on, the operation is entirely automatic. The voltage is supplied to the arc lamp successively from the lowest voltage to the full voltage thereby avoiding any chance of damaging the arc lamp and at the end of the treatment the apparatus is automatically shut off, the voltage to the arc lamp is shut off, and the arc lamp is automatically raised above the patient so that there is no chance of injury by burning or otherwise. When the treatment is over and the apparatus has been shut off the attendant in the outer room is advised of this matter from the signal board and can then proceed to the proper room.

It will therefore be noted that no time is lost in administering the treatment for as soon as the treatment is over the next patient may be brought into the room.

In the drawings I have illustrated the preferred arrangement of the various elements to carry out the spirit of the invention and while the apparatus illustrated is employed in connection with an arc lamp, such as described and claimed in my copending application 278,285, it will be understood that I am not to be limited thereto as from the following detailed description other applications of the apparatus will be readily apparent.

In the drawings, 10 is a housing or enclosure of metal or other suitable material adapted to be suitably supported upon a wall or other structure. Within the housing 10 there is disposed a base 11 of any suitable material at the front of which is bolted or otherwise secured an upright 12, preferably of steel, and spaced parallel with respect to the back 13 of the enclosure 10. An hour glass 14 filled with mercury 15 or other suitable material is securely mounted within a fiber frame 16a as clearly illustrated in Figs. 1 and 3 and bolted to the fiber frame and extending around the ends of the hour glass 14 are metallic guard strips 16. At the forward end of the fiber frame 16a and extending diametrically opposite are a pair of semicircular metal strips 17, bolted or otherwise suitably secured, for a purpose to be later described. A stub shaft 18 is suitably connected to the front face of the fiber frame 16a and is journaled in the upper portion of the upright 12, while to the opposite face of the fiber frame 16a a shaft 19 is secured and is journaled for rotation in a bearing 20 bolted or otherwise secured to the back 13 of the enclosure 10. It will therefore be readily seen that the fiber frame 16a carrying the hour glass 14 is adapted to rotate about the axis of the stub shaft 18 and the shaft 19. Attached to the upright 12 by bolts or other means is a flat metal spring 21 which has its free end engaging and partly encircling the stub shaft 18 between the upright 12 and the fiber frame 16a to thereby maintain the hour glass 14 in its normally vertical position.

To the back 13 of the enclosure 10 is bolted or otherwise secured a pair of angle brackets 22 which have their free ends parallel and extend inwardly from the back 13 which are provided with aligned openings 23 within which is slidably disposed a vertically extending bar 24. The lower end of the bar 24 is connected to or formed integral with an armature 25 of a solenoid 26 suitably supported upon the base 11. The solenoid may be of any standard construction but should be of sufficient size to raise the bar 24 when the solenoid is energized. The bar 24 has pivotally connected thereto a spring-pressed dog 27 which is adapted to engage a ratchet wheel 28 keyed or otherwise secured upon the shaft 19 adjacent the bar 24, the teeth of the ratchet wheel being disposed in such a manner that when the bar 24 is moved upwardly the dog 27 will engage the teeth of the ratchet wheel 28 and rotate the frame 16a and the hour glass 14 in a clockwise direction about the axis of the stub shaft 18 and the shaft 19. However, when the bar 254 is lowered the dog 27 is adapted to ride over the teeth of the ratchet wheel without any rotary effect upon the frame 16a.

It will be seen therefore that when the solenoid 26 is energized the armature 25 is moved upwardly and being connected to the bar causes the dog 27 to engage the ratchet wheel 28 and rotate the frame 16a and hour glass 14 as previously described. When the hour glass 14 has been rotated through an arc of approximately 90° the mercury 15 or other suitable solution will then begin to flow and the hour glass will gradually be rotated due to gravity from the 90° position to the 180° position during which time the mercury has completely run from one chamber into the other.

A strip of fiber 29 or other insulating material is suitably supported within the enclosure 10 as shown in Fig. 1 and upon this strip are mounted in the present instance, three mercury switches which are suitably connected in parallel. Each of these mercury switches are connected respectively to any desirable resistance element 30a in such a manner as to successively increase or step up the voltage supplied to the arc lamp or other device. For example, one of the mercury switches 30 may be connected with the resistance in such a manner as to supply 110 volts to the arc lamp when the circuit is closed. Another 31, may be connected to the resistance so as to supply approximately 175 volts to the arc lamp when the circuit is closed, and another 32, may be connected to the resistance in such a manner as to supply 220 volts or full voltage to the arc lamp or other device. The mercury switches 30, 31 and 32 are substantially identical in construction and comprise blocks of insulating material 34 which are pivoted at their forward portions at 35 to the strip of insulating material 29. Elongated glass tubes 36 adapted to contain mercury or other suitable conducting material are maintained in a substantially horizontal position thereon by metal clips 37 bolted or otherwise secured to the insulating block 34. The lower portions of the tubes 36 are provided with terminals 38 and 39 to which may be connected any suitable conductors. It will be noted that when the tubes 36 of the mercury switches are in substantially horizontal position the mercury will cause contact between the terminals 38 and 39 and thereby close the circuit therethrough, but when dropped to a position slightly below the horizontal in oscillation about the pivot 35, the mercury is contained in one end only of the glass tubes and in contact with only the terminal 29 and thereby breaks the current through the mercury switches. The outer under portions of the insulating blocks 34 abut with adjustable stops 40 to thereby limit the oscillation about the pivots 35. At the forward ends of the insulating blocks 34 are provided laterally extending arms 41 having bifurcated ends between which are rotatably disposed rollers 42a. It is to be noted that the mercury switches 30 and 31 normally engage the stops 40 and in so doing render the circuits connected therewith ineffective or open while the lowermost mercury switch 32 is normally in horizontal position whereby the circuit connected therewith is closed due to engagement between the semi-circular metallic strips 17 and the roller 42a of the mercury switch 32. When the metallic strip 17 is moved out of engagement with the roller 42a a spring 43a having one end connected to the insulating strip 29 and its free end in engagement with the insulating block 34 of the switch 32 causes the switch to oscillate about its pivot 35 and thereby move the block 34 into engagement with the respective stop 41 and break the circuit due to the mercury passing to one end of the tube 36.

When the bar 27 is moved upwardly due to the energizing of the solenoid 26 thereby causing the hour glass 14 and fiber frame 16a to be rotated, one of the semi-circular metallic strips 17 engages with the roller 42a of the upper mercury switch 30 and, as the mercury 15 within the hour glass 14 passes from one side to the other, it is caused to rotate about its axis due to the action of gravity upon the mercury. As the strip 17 gradually moves past the roller 42a the block 34 is oscillated about its pivot 35 in such a manner as to cause the mercury to flow between the terminals 38 and 39 thereby closing the circuit. As this switch is connected with the arc lamp and also with a block of resistance 30a in such a manner as to supply approximately 110 volts this voltage is supplied to the arc lamp. As the mercury 15 continues to flow from one end of the hour glass 14 to the other, gravity tends to further rotate the frame and the metallic strip 17 is brought into contact with the roller 42a of the switch 31 thereby causing the same to be oscillated about its pivot and the mercury in the tube 36 to flow between the contacts 38 and 39 and thereby close the circuit. As this switch is connected to the arc lamp and to the resistance 30a in such a manner as to supply approximately 175 volts, this amount of voltage is supplied to the arc lamp. Finally when practically all of the mercury has passed from one side of the hour glass 14 to the other and gravity has moved the frame around so that the hour glass is in substantially vertical position, the metallic strip 17 engages the roller 42a of the mercury switch 32 and thereby closes the contact between the terminals 38 and 39. This switch being connected with the resistance 30a and the arc lamp so as to supply 220 volts, this voltage is then thrown into the lamp. It is to be noted that as the metallic strip 17 leaves the rollers 42 of the mercury switches 30 and 31, gravity acts upon the switches due to their eccentric pivot and causes them to drop into engagement with the stops 40 thereby breaking the circuit through these switches.

The apparatus so far described clearly sets forth the manner in which the voltage supplied to the arc lamp is automatically increased so as to prevent injury or damage to the lamp. It is necessary, of course, to provide an automatic switch whereby the solenoid 26 is energized to kick over the hour glass 14 so as to bring the apparatus associated therewith into cooperation with the mercury switches 30, 31 and 32 successively for the purpose already described.

The apparatus preferably employed for this purpose will be explained in detail, although it should be understood that different types of apparatus may be employed for fulfilling the purpose desired. A circuit breaker switch indicated generally by the numeral 42 comprises a magnet 43 rigidly supported upon a block or panel of insulating material 44 secured within a metallic housing 45 adapted to be attached to a wall or other suitable supporting structure. The circuit breaker switch 42 is provided with an arm 46 pivotally connected at 47 to a pair of spaced brackets 48 riveted or otherwise secured to the insulating panel 44. The arm 46 extends adjacent the magnet 43 and when the latter is energized through the closing of a suitable circuit connected therewith, the arm 46 is moved inwardly into engagement with the magnet 43. Secured to the arm 46 is an insulating strip 49 upon which is secured an upwardly extending metallic arm 50. The upper free end of the arm 50 is bent outwardly at 51 so as to provide a rounded portion adapted to engage a dog or cam 52 for a purpose to be latter described. A mercury operable switch 53 similar in construction and operation to the mercury switches 30, 31 and 32 already described comprises an elongated glass tube 54 having spaced terminals 55 and 56, one of which is connected by a conductor 125 to the solenoid 26 while the other is connected to the opposite power line through a push button starter switch 58. This glass tube 54 is secured, by encircling metallic straps 59, to a block of insulation 60 pivotally connected at 61 to one side of a pair of spaced insulators 62. It is to be noted that the insulating block 60 is eccentrically pivoted so that the outer end will normally be lower than the inner end, and as a result the mercury 63 within the glass tube 54 will normally engage only the contact 56 and the circuit through the mercury switch will normally be open.

The cam 52 which is pivotally connected at the outer end of the insulating block 60 is provided with an extension 64 with which the arm 50 of the circuit breaker 42 is adapted to cooperate. Extending diametrically opposite from the extension 64 is an extension 65 adapted to cooperate with a stop 66 bolted or otherwise secured to the insulating block 60, as clearly shown in Fig. 7. When the magnet 43 is energized so as to move the arm 46 inwardly, the outturned end 51 of the arm 50 engages the cammed surface 67 of the cam 52 and the stop 66 being in engagement with the extension 64 prevents oscillation of the cam 52 about its axis. As a result, the outturned end 51 rides over the cammed surface 67 and oscillates the insulating block 60 about its pivot 61, causing the mercury 63 within the tube 54 to flow into contact with both terminals and close the circuit through the mercury switch. The closing of this circuit energizes the solenoid 26 and, as a result, the bar 24 carrying the dog 27 is moved upwardly and the latter cooperating with the ratchet wheel 28 kicks over or partially oscillates the hour glass 14. As the mercury in the hour glass 14 passes from one side to the other, gravity tends to rotate the hour glass a further distance about its axis and the mercury switches 30, 31 and 32 are actuated in the manner already described. When the outturned end 51 of the arm 50 passes the end of the extension 64, the insulating block 60 drops back into its normal position, due to gravity, and in so doing the circuit through the mercury switch 53 is broken. It will therefore be noted that the only function of the mercury switch 53 is to close the circuit to the solenoid 26 to thereby energize the latter so as to kick over or partially rotate the hour glass 14.

Secured to the insulating panel 44 are a pair of spaced insulators 68 similar to the insulators 62 and pivotally connected to the inner insulator 68 is a mercury operable switch 69 identical in construction and operation to the mercury operable switch 53 and in view of the detailed description of the latter it is not believed necessary to describe in detail the switch 69 referred to. It will however be noted, as clearly shown in Fig. 6, that the cam 52a is in a reversed position with respect to the cam 52 and cooperates with an upwardly extending metallic arm 50a bolted or otherwise secured to the insulating strip 49. The upper free end of the arm 50a is bent outwardly at 51 and when the magnet 43 of the circuit breaker 42 is energized it causes the outturned end 51 of the arm 50a to engage with the extension 64 and partially oscillate the cam 52a about its pivot until the outturned end 51 passes beyond the cam. During this movement it will be noted that the mercury switch 69 is not moved but, upon deenergizing the magnet 43 of the circuit breaker 42, the outturned end 51 rides under the cammed surface 67 causing the insulating block 60 to oscillate about the axis of its pivot 61 and in so doing the mercury within the switch 69 flows into contact with both terminals thereby closing a circuit connected with the solenoid 70 and causes the latter to be energized. As a result, the latching mechanism which retains the arc lamp 71 in its lowered or operating position is released and the counter-weight 72 raises the arc lamp 71 away from the patient being treated. The purpose therefore of the switch 69 is to merely energize the solenoid 70 to thereby release the locking mechanism of the lamp 71.

A pair of upwardly extending contact arms 73, 74 are secured to the outer ends of the insulating strip 49 as clearly shown in Fig. 8, and are adapted to be moved inwardly into contact with the contacts 75 and 76 respectively, the latter being secured between the insulators 62 and 68. The contact arm 73 is connected to one terminal of a snap switch 77 by a conductor 78, while the contact arm 74 is connected to the opposite terminal of the snap switch 77 by a conductor 79 in such a manner that when the snap switch 77 is moved to one position it closes the circuit between the contacts and when moved to the opposite position it opens the circuit between the contacts. The contact 75 with which the contact arm 73 cooperates is connected by a conductor 80 with one terminal of the push button switch 58 and by suitable conductors with the terminals 55 of the mercury operable switches 53 and 69. There is also a conductor extending from the contact 75 to a light panel which will be later described. The contact 76 is connected by a conductor 81 to the magnet 43 of the circuit breaker 42 as well as to the power panel from the source of supply to the overhead solenoid 70 for actuating the arc lamp 71 and to one terminal of the solenoid 26 for actuating the hour glass 14. To one side of the contact arm 73 there is a contact arm 82 electrically and mechanically connected to the latter which engages a contact 83 secured to the insulating panel 44 when the magnet 43 of the circuit breaker is energized and this contact is connected by a suitable conductor 84 with a terminal of the push button switch 58 for a purpose to be later described. At the opposite side of the insulating strip 49 there is secured an upwardly extending contact arm 85 which engages a contact 86 when the magnet 43 of the circuit breaker is energized and this contact 86 is connected by a suitable conductor to signal lights as well as to a timing mechanism which will be later described. The contact arm 85 is connected by a suitable conductor to the opposite side of the signal lights referred to.

The snap switch 77 is also provided with a second pair of terminals one of which is connected by the conductor 87 to the terminals 38 of the mercury operable switches 30, 31 and 32 while the other terminal is connected by a conductor 88 to one terminal of the arc lamp 71.

It is to be noted therefore that the operation of the apparatus so far described necessitates first closing the snap switch 77 which controls the flow of current between the arc lamp and the contact arms 50 and 50a of the circuit breaker 42. However, the apparatus will not function until the push button switch is depressed which closes the circuit that energizes the magnet 43 of the circuit breaker. The minute the magnet 43 is energized it moves the contact arms 50 and 50a inwardly, which results in the contact arm 50 engaging the cam 52 and closing the circuit through the mercury operable switch 53 which energizes the solenoid 26. This, as previously stated, causes the hour glass 14 to be kicked over or partially rotated and causes the strip 17 to engage the first mercury switch. As the mercury within the hour glass 14 changes from one side to the other and the hour glass is slowly rotated about its axis, due to gravity, the switch 30 is moved about its pivot 35 until the flow of mercury closes the circuit. This switch, being connected through the resistance 30a to the arc lamp 71, supplies the desired voltage thereto which may be approximately 110 volts. This voltage is maintained until the hour glass further rotates due to gravity when the strip 17 is brought into engagement with the roller 42 of the switch 31 and causing the switch to be oscillated about its pivot 35 the circuit is closed by the flow of mercury. As this switch 31 is connected through the resistance 30a with the arc lamp 71 an increase of voltage is supplied and in the present case may be approximately 175 volts. This voltage is maintained until the mercury within the hour glass 14 has entirely passed from one side to the other in which case it assumes the position shown in Fig. 1 in which the strip 17 cooperates with the roller 42 of the switch 32 and having oscillated the switch 32 about its pivot 35 causes the flow of mercury to close the circuit through the switch. This switch being connected through the resistance 30a with the arc lamp 71 permits the full flow or 220 volts to be supplied to the arc lamp 71 and this voltage is maintained for the desired period of time. It will, therefore, be noted that the danger of breakage or damage to the arc lamp, due to overheating the lamp by the application of the entire voltage at once which results in too quickly heating the lamp, is entirely eliminated.

It is desirable, of course, to have an automatic means for cutting off the current to the arc lamp 71 at the conclusion of the treatment and also automatic means for raising the arc lamp away from the patient to avoid burning or other injury to the patient. This may be accomplished in a number of ways but the apparatus about to be described embodies the preferred construction and arrangement.

The timing mechanism comprises a base 89 preferably of metal and having a back 90 formed integral therewith. The base is supported upon the bottom of the housing 45 and is of sufficient width to be received therein. A pair of solenoids 91 are secured upon the base 89 and at the opposite sides thereof, are connected in series, and are adapted to operate in unison. The solenoids have armatures 92 disposed therein which are provided with upwardly extending rods 93. The upper portions of these rods are slidably mounted within suitable openings in the outer ends of brackets 94 bolted or otherwise secured to the back 90. Extending transversely between the brackets 94 there is a rod 95 having its ends secured within the brackets and between the rod 95 and the back 90 is a worm shaft 96, as clearly shown in Figs. 4 and 9. This worm shaft has its ends rotatably journaled within the brackets 94 and secured to one end of the worm shaft and rotatable therewith is a ratchet wheel 97. The ratchet wheel is adapted to fit within a suitable recess 98 provided in one of the brackets 94 and is preferably in alignment with the adjacent rod 93 of one of the solenoids 91, the one to the right as shown in Fig. 9. The rod 93 carries a dog 99 which is pivotally connected thereto and has its free end extending forwardly into engagement with the teeth of the ratchet wheel, as shown in Fig. 5. This dog is normally held in engagement with the ratchet wheel 97 so that when the rod 93 is moved upwardly the dog 99 will engage the teeth and move the ratchet wheel and the worm 96 in a counter-clockwise direction, as shown in Fig. 5. When the rod 93 is moved downwardly, the dog 99 is free to pass over the teeth and does not affect the rotation of the worm shaft 96. It is therefore to be noted that when the solenoids 91 are energized the rods 93 are moved upwardly and through the dog 99 and ratchet wheel 97 the worm shaft 96 is rotated a certain proportion of an entire revolution. When the solenoids are deenergized the rods 93 are lowered and the dog 99 riding over the teeth of the ratchet wheel 97 is brought into engagement with a lower tooth.

An insulating block 101 is attached to the top of one of the brackets 94 and to the left as shown in Fig. 9. Upon this block there is secured a limit switch 102 which normally maintains the circuit in closed condition but which has an outwardly projecting pin 103 which, when pressed inwardly, breaks the circuit. This limit switch 102 is connected by a conductor 104 to a terminal of the push button switch 58 while the other terminal of the limit switch is connected by a conductor 105 with the magnet 43 of the circuit breaker 42. It will therefore be noted that so long as the pin 103 of the limit switch 102 is in its normally outward position the circuit to the circuit breaker 42 is closed but that as soon as the pin 103 is pressed inwardly the contact is broken and the circuit opened. This latter will naturally deenergize the magnet 43 of the circuit breaker 42 and when so the arm 46 is adapted to move outwardly and all the contact arms carried by the arm 46 are likewise moved out of engagement with their cooperating contacts.

A split nut 106 is adapted to be threaded back and forth upon the worm shaft 96, depending upon the direction of rotation of the shaft. This split nut is provided with a pair of levers 107 which are provided with sleeves 108 adapted to slide upon the rod 95. These sleeves 108 are also rotatably supported upon the rod 95 in such a manner that when the operating levers 107 are depressed the split nut 106 is moved out of engagement with the worm shaft 96 and may be moved along the rod to any desired position. A spring 110 disposed between the levers 107 and between the split nut 106 and sleeves 108, normally maintains the split nut in engagement with the worm shaft 96. The upper half of the split nut 106 is provided with an extension or stop 109 in alignment with the pin 103 of the limit switch 102. It will therefore be seen that when the worm shaft 96 is rotated in one direction the split nut 106 will be fed along until the stop 109 engages the pin 103 and, moving the latter inwardly, causes the circuit to be broken. It will also be noted that the split nut 106 may be positioned upon the worm shaft 96 wherever desired by depressing the levers 109 and such position will depend upon the length of time desired to administer the treatment to the patient which will be determinable by the length of time it takes the stop 109 to engage with the pin 103 of the limit switch 102.

A pair of pulsating switches 111 are mounted adjacent the brackets 94 and comprise upwardly extending contacts 112 and spring arms 113 having offset portions positioned in alignment with insulating blocks 114 secured to the upper ends of the rods 93. When the rods 93 are moved upwardly the insulating blocks 114 engage with the offset portion of the spring arms 113 and move them into engagement with the contact arms 112 thereby closing a circuit. As the rods 93 move in a reverse direction the insulating blocks 114 are disengaged from the spring arms 113 and the latter then become disengaged from the contact arms 112 and the circuit is again broken. These pulsating switches 111 are connected in series and the terminal of one switch is connected through the contact 86, while a suitable conductor leads from there to a signal light on the signal board. Therefore, as the rods 93 move up and down past the pulsating switches 111, the circuit is closed therethrough and the lights upon the panel board are caused to pulsate thereby indicating to the attendant that the machine is in operation in the particular room wherein the apparatus is located. The terminal of the opposite pulsating switch is connected to the light upon the panel board and upon the opposite side so as to complete the circuit.

As indicated in Fig. 1, the housing 45 may be provided with a cover member 115 having suitable openings to receive the snap switch 77 and the push button starter switch 58. Also there is provided an elongated opening 116 through which the levers 107 extend and directly above the opening 116 is a graduated strip 117, the graduations of which correspond to the running time of the apparatus and the length of the treatment. One of the levers 107 is provided with a pointer 118 which is positioned so as to cooperate with the graduations so that the timing mechanism may be properly set. A metal conduit 119 is also connected to the housing 45 and extends upwardly to thereby enclose the necessary wires.

At the upper part of the housing 45 there may be provided a plurality of lights 120 suitably connected as shown in the wiring diagram so that the attendant in any one particular room in which the apparatus is installed can see at a glance whether the apparatus in the other treatment rooms are in operation.

Figure 10:
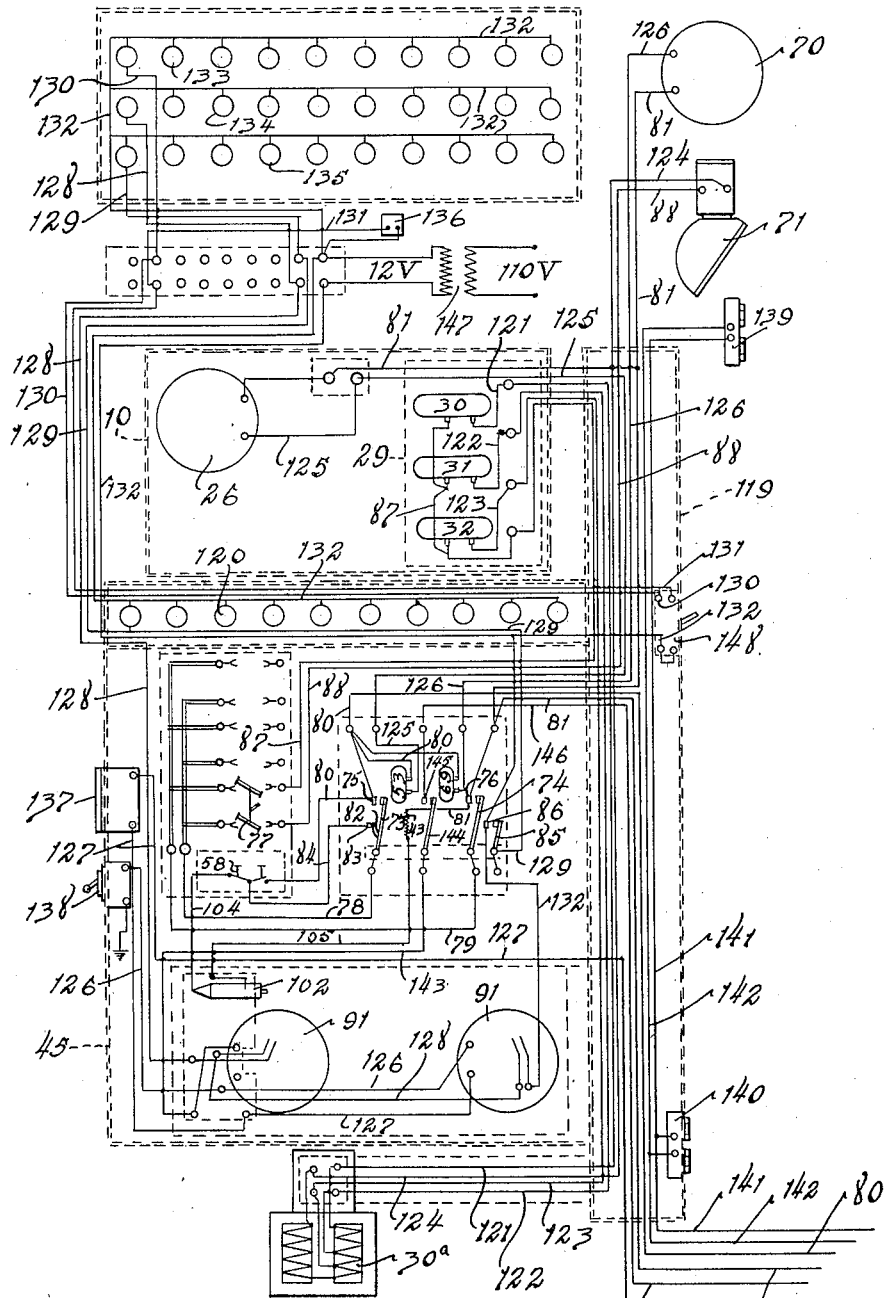
Fig. 10 is a wiring diagram of the apparatus.

The wiring diagram employed with the before described apparatus is clearly illustrated in Fig. 10 and will need very little explanation as the connections are very clearly set forth therein. The solenoid 26 for actuating the hour glass 14 is connected by a conductor 81 with one of the terminals of the overhead solenoid 70 for actuating the mechanism which controls the movement of the arc lamp 71 and also connected by the conductor 81 with the contact arm 76 on the main circuit breaker and with the magnet 43 of the circuit breaker switch 42. These members are also connected by the conductor 81 with the power panel which may be installed in any suitable location. The other terminal of the solenoid 26 is connected by a conductor 125 with one of the terminals of the mercury switch 53 supported by the circuit breaker 42 while the opposite terminal of the circuit breaker 53 is connected by the conductor 80 with one of the terminals of the mercury switch 64 with the contact 75 carried by the circuit breaker and with one terminal of the push button switch 58. The conductor 80 also connects these members with the opposite side of the line on the power panel suitably located as previously described. The other terminal of the mercury switch 64 is connected by a conductor 126 to one terminal of the overhead solenoid 70 which controls the latching mechanism for the arc lamp 71.

The mercury switches 30, 31 and 32 are connected in parallel by a conductor 87 common to all of the switches and is connected to one of the terminals of the snap switch 77. The mercury switch 30 has its other terminal connected by a conductor 121 with the resistance 30a for the purpose previously described, while the mercury switches 31 and 32 have their other terminals connected by conductors 122 and 123 respectively with similar terminals on the resistance 30a so as to supply the desired voltages. The opposite side of the resistance 30a is connected by a conductor 124 to one of the terminals of the arc lamp 71 while the opposite terminal of the arc lamp 71 is connected by a conductor 88 with one of the terminals of the snap switch 77. The other two terminals of the snap switch 77 are connected by conductors 78 and 79 respectively with the contact arms 73 and 74 supported on the main circuit breaker 43 for actuating in a manner previously described. Another of the terminals on the push button switch 58 is connected by the conductor 84 with a contact 83 upon the main circuit breaker with which the contact arm 82 engages when in circuit closing position. The other contact of the push button switch 58 is connected by a conductor 104 with the limit switch 102 while the opposite terminal of the limit switch is connected by a conductor 105 with one of the terminals 43 of the circuit breaker 42. Therefore, when the push button switch 58 is depressed so as to close the circuit the magnet 43 is energized, causing the movable arm 46 to be drawn inwardly and the contact arms carried thereby to be moved into engagement with their contacts and the circuits with which they are associated to be closed. When the push button switch 58 is moved in the opposite direction so as to open the circuit the magnet 43 of the circuit breaker is deenergized thus causing the arm 46 to move outwardly and as a result, cause the contact arms to disengage from their respective contacts and to open the circuit with which they are associated.

For energizing the solenoids 91 of the timing apparatus, these solenoids are connected in series, being connected together by the conductor 126 and to one terminal of an emergency switch 138 mounted on the side of the housing 46, the other terminal of the emergency switch being connected to a ground as shown. The other terminal of one of the solenoids 91 is connected by a conductor 127 with one terminal of a fuse 137 while the other terminal of the fuse is connected by the conductor 127 to a master timer which is adapted to control the timers of all the apparatus in the different operating rooms. The other terminal of the opposite solenoid 91 is connected by a conductor 143 with the contact arm 144 mounted upon the circuit breaker 42. This contact arm 144 is adapted to engage a contact 145 so as to close a circuit when the magnet 43 is energized. The contact 145 is connected by a conductor 146 to the opposite side of the master control as has been already stated.

The pulsating switches 111 already described are also connected in series by a conductor 128 which extends therebetween. The opposite terminal or side of one of the pulsating switches is connected by a conductor 132 with a contact 86 on the main circuit breaker through the resistance 147 and to one side or terminal of the pulsating lights 134. This conductor 132 is also connected to one side of the emergency switch 148. The other contact of the opposite pulsating switch is connected by a conductor 128 with the opposite side or terminal of one of the pulsating lights 134. It might be here stated that these pulsating lights 134 and emergency lights 133 and room lights 135 are mounted in an attendant's room where he or she may readily tell at a glance just which of the rooms are occupied, which of the machines are in operation, and also note from the emergency lights whether the patient is in need of anything, in which case the emergency switch 148 is closed by the patient. As the apparatus herein described is for use in one of the operating rooms only one of the pulsating lights is actuated by the apparatus and the apparatus in any additional room would be connected up with any one of the remaining pulsating lights 134 as well as the emergency lights 133 and the room lights 135. The same is true of the lights 120 mounted upon the board of the apparatus, these lights corresponding in number to the number of machines which are being used so that an attendant in any of the operating rooms within which the apparatus is installed may see at a glance at these lights just which of the rooms are in operation and treatments being administered.

Included in the wiring diagram are plugs 139 and 140 which do not form any part of this invention but happen to be present in the installation of which the foregoing is a description. These plugs may be used for many purposes by merely plugging in in the common way and are connected in parallel by conductors 141 and 143 which extend to a suitable light panel to which they are connected and which may be installed in any desired location. The voltage for the lights 133, 134 and 135 as well as lights 120 is supplied from the main line preferably 110 volts and is stepped down through the transformer 147 to 12 volts. This latter voltage, of course, is not essential as smaller voltage lamps may be employed. The opposite side of the lights 133 are connected by a conductor 130 with one terminal of the emergency switch 148 while the other terminal of the switch 148 is connected by a conductor 131 with one terminal of the emergency buzzer 136. The opposite terminal of the buzzer is connected with the conductor 132 so as to complete the circuit through the buzzer. The opposite terminal of the light 135 is connected by a conductor 129 with the light 120 and with the contact arm 85 carried by the circuit breaker 42 while the opposite side of the light 120 as well as all of the lights on the particular apparatus are connected by conductor 132 already described.

While I have described the preferred embodiment of the invention it is to be understood that I am not to be limited thereto as changes and modifications may be resorted to without departing from the spirit and scope of the invention as defined in the appended claims.

Having thus described my invention, I claim:

1. In an apparatus of the character described, means for controlling the voltage supply to a lamp which comprises a resistance element having one side connected to said lamp, a plurality of normally open switches connected in parallel and having other connections with different points on said resistance to obtain the desired voltages, and means for automatically actuating said switches in sequence to thereby supply said lamp with increasing voltages.

2. In an apparatus of the character described, means for controlling the voltage supply to a lamp which comprises a resistance element having one side connected to said lamp, a plurality of normally open mercury operable switches connected in parallel and having other connections with different points on said resistance to obtain the desired voltages, and means for actuating said switches in sequence so as to cause the mercury to flow to close the circuits to thereby supply said lamp with increasing voltages.

3. In an apparatus of the character described, means for controlling the voltage supply to a lamp which comprises a resistance element having one side connected to said lamp, a plurality of switches normally open by gravity connected in parallel and having other connections with different points on said resistance to obtain the desired voltages, and means for automatically actuating said switches in sequence to thereby supply said lamp with increasing voltages.

4. In an apparatus of the character described, means for controlling the voltage supply to a lamp which comprises a resistance element having one side connected to said lamp, a plurality of switches normally open by gravity connected in parallel and having other connections with different points on said resistance to obtain the desired voltages, and gravity actuated means for actuating said switches in sequence to thereby supply said lamp with increasing voltages.

5. In an apparatus of the character described, means for controlling the voltage supply to a lamp which comprises a resistance element having one side connected to said lamp, a plurality of switches normally open by gravity connected in parallel and having other connections with different points on said resistance to obtain the desired voltages, a rotatable member, and means for rotating said member, said rotatable member being adapted to actuate said switches in sequence to thereby supply said lamp with increasing voltages.

6. In an apparatus of the character described, means for controlling the voltage supply to a lamp which comprises a resistance element having one side connected to said lamp, a plurality of normally open mercury operable switches connected in parallel and having other connections with different points on said resistance to obtain the desired voltages, solenoid actuated means for closing said switches in sequence to supply said lamp with increasing voltages, and means for energizing said solenoid.

7. In an apparatus of the character described, means for controlling the voltage supply to a lamp which comprises a resistance element having one side connected to said lamp, a plurality of normally open mercury operable switches connected in parallel and having other connections with different points on said resistance to obtain the desired voltages, rotatable means adapted to cooperate with said switches successively to close circuits controlled thereby so as to supply said lamp with increasing voltages, and means for imparting rotation to said means.

8. In an apparatus of the character described, means for controlling the voltage supply to a lamp which comprises a resistance element having one side connected to said lamp, a plurality of normally open mercury operable switches connected in parallel and having other connections with different points on said resistance to obtain the desired voltages, rotatable means adapted to cooperate with said switches successively to close circuits controlled thereby so as to supply said lamp with increasing voltages, said rotatable means being actuated by gravity after an initial start, and means for initially starting said rotatable means.

9. In an apparatus of the character described, means for controlling the voltage supply to a lamp which comprises a resistance element having one side connected to said lamp, a plurality of pivotally mounted switches normally open connected in parallel and having other connections with different points on said resistance to obtain the desired voltages, gravity actuated means rotatably mounted adjacent said switches and adapted to successively engage said switches to close circuits controlled thereby, and means for imparting initial rotary movement to said gravity actuated means.

10. In an apparatus of the character described, means for controlling the voltage supply to a lamp which comprises a resistance element having one side connected to said lamp, a plurality of pivotally mounted switches normally open connected in parallel and having other connections with different points on said resistance to obtain the desired voltages, gravity actuated means rotatably mounted adjacent said switches and adapted to successively engage said switches to close circuits controlled thereby, and a solenoid actuating means for imparting initial rotary movement to said gravity actuated means.

11. In an apparatus of the character described, means for controlling the voltage supplied to a lamp which comprises a resistance element having one side connected to said lamp, a plurality of normally open switches connected in parellel and having other connections with different points on said series to obtain the desired voltages, means for automatically actuating said switches to thereby supply said lamp with increasing voltages, a circuit breaker, a contact arm carried thereby and normally in circuit open position, means for actuating said circuit breaker to thereby move said arm to circuit closed position, and a limit switch associated with said circuit breaker and normally in circuit closed position, the opening of said limit switch actuating said circuit breaker to thereby cause said contact arm to move to circuit open position and shut off the current to said lamp.

12. In an apparatus of the character described, means for controlling the voltage supplied to a lamp which comprises a resistance element having one side connected to said lamp, a plurality of normally open switches connected in series and having other connections with different points on said series to obtain the desired voltages, means for automatically actuating said switches to thereby supply said lamp with increasing voltages, a circuit breaker, a contact arm carried by said circuit breaker and normally in circuit open position, means for energizing said circuit breaker to thereby move said contact arm to circuit closed position and to close the circuit to said lamp, and a normally closed switch associated with said circuit breaker and adapted to be open to thereby deenergize the circuit breaker and interrupt the circuit of said lamp.

13. In an apparatus of the character described, means for controlling the voltage supplied to a lamp which comprises a resistance element having one side connected to said lamp, a plurality of normally open switches connected in series and having other connections with different points on said series to obtain the desired voltages, means for automatically actuating said switches to thereby supply said lamp with increasing voltages, a circuit breaker, a contact arm carried by said circuit breaker and normally in circuit open position, means for energizing said circuit breaker to thereby move said contact arm to circuit closed position and to close the circuit to said lamp, a normally closed switch associated with said circuit breaker and adapted to be open to thereby deenergize the circuit breaker and interrupt the circuit of said lamp, and means for moving said normally closed switch to its open position.

14. In an apparatus of the character described, means for controlling the voltage supplied to a lamp which comprises a resistance element having one side connected to said lamp, a plurality of normally open switches connected in series and having other connections with different points on said series to obtain the desired voltages, means for automatically actuating said switches to thereby supply said lamp with increasing voltages, a circuit breaker, a contact arm carried by said circuit breaker and normally in circuit open position, means for energizing said circuit breaker to thereby move said contact arm to circuit closed position and to close the circuit to said lamp, and a normally closed switch associated with said circuit breaker and adapted to be open to thereby deenergize the circuit breaker and interrupt the circuit of said lamp.

15. In an apparatus of the character described, a resistance element having one side connected to said lamp, a plurality of normally open switches connected in series and having other connections with different points on said resistance to obtain the desired voltages, means including a solenoid for actuating said switches in sequence to thereby supply the lamp with increasing voltages, a circuit breaker including a magnet, a contact arm carried by said circuit breaker and normally in circuit open position, a normally closed switch associated with said circuit breaker, means for energizing the magnet of said circuit breaker to thereby move said contact into circuit closed position to close the circuit to said lamp, a switch actuated by said circuit breaker to energize said solenoid, the opening of said normally closed switch deenergizing the magnet of said circuit breaker and causing the circuit to said lamp to be interrupted by the movement of said contact arm.

In testimony whereof, I hereunto affix my signature.

GEORGE W. HOPKINS.